United States Patent [19]

Bikowsky et al.

[11] Patent Number: 5,212,775
[45] Date of Patent: May 18, 1993

[54] METHOD AND APPARATUS FOR OBSERVING INTERNAL MEMORY-MAPPED REGISTERS

[75] Inventors: Zeev Bikowsky, Netanya; Dan Biran, Raanana, both of Israel

[73] Assignee: National Semiconductor Corporation, Santa Clara, Calif.

[21] Appl. No.: 750,771

[22] Filed: Aug. 22, 1991

Related U.S. Application Data

[63] Continuation of Ser. No. 461,023, Jan. 4, 1990, abandoned.

[51] Int. Cl.⁵ .............................. G06F 13/00
[52] U.S. Cl. .......................... 395/275; 395/325; 395/725; 364/231.5; 364/238.3; 364/271.1; 364/DIG. 1; 364/926.93; 364/927.98; 364/942.3; 364/DIG. 2
[58] Field of Search ............ 364/200, DIG. 1, 231.5, 364/238.3, 271.1, 926.93, 927.98, 927.99, 942.3, DIG. 2; 395/275, 325, 425, 725; 371/23, 22.1, 16.1

[56] References Cited

U.S. PATENT DOCUMENTS

| | | | |
|---|---|---|---|
| 4,257,095 | 3/1981 | Nadir | 364/200 |
| 4,535,404 | 8/1985 | Shenk | 364/200 |
| 4,564,900 | 1/1986 | Smitt | 364/200 |
| 4,575,816 | 3/1986 | Hendrickson et al. | 364/900 |
| 4,674,089 | 6/1987 | Poret et al. | 371/25 |
| 4,766,536 | 8/1988 | Wilson, Jr. et al. | 364/200 |
| 4,809,217 | 2/1989 | Floro et al. | 364/900 |
| 4,814,977 | 3/1989 | Buonomo et al. | 364/200 |
| 4,924,427 | 5/1990 | Savage et al. | 364/900 |
| 4,933,835 | 6/1990 | Sachs et al. | 364/200 |
| 4,987,529 | 1/1991 | Craft et al. | 364/200 |

FOREIGN PATENT DOCUMENTS 0313 848  3/1989  European Pat. Off.

Primary Examiner—Michael R. Fleming
Assistant Examiner—Glenn A. Auve
Attorney, Agent, or Firm—Limbach & Limbach

[57] ABSTRACT

A method and apparatus for observing the contents on internal memory-mapped registers of controllers and co-processors which have been integrated on-chip with a central processing unit ("CPU"). The CPU asserts a first signal when access to internal memory is requested and deactivates a second signal which would normally allow simultaneous access to both internal and external memory locations. In this way, the contents of internal memory may be observed in real time.

6 Claims, 2 Drawing Sheets

METHOD AND APPARATUS FOR OBSERVING INTERNAL MEMORY-MAPPED REGISTERS

This is a continuation of co-pending application Ser. No. 461,023, filed on Jan. 4, 1990, now abandoned.

BACKGROUND

1. Field of the Invention

The present invention relates to data processing systems, and more specifically to a method and apparatus for observing the contents of a central processing unit's internal memory-mapped registers.

2. Discussion of the Prior Art

In conventional digital data processing system with n-bit architecture, the central processing unit (CPU) is capable of generating $2^n$ addresses for referencing instructions or data. For example, a 16-bit computer is capable of generating $2^{16}$ or 65,536 addresses. These addresses are generally used to reference devices which are located outside the CPU environment, so-called peripheral or external devices. The interface between the CPU and the peripheral devices consists of a system bus, including an address bus and a data bus, wherein the CPU, responding to an instruction request, sends an address onto the address bus which is connected to the peripheral device. If the peripheral device is memory storage, then data can be transferred directly between the CPU and memory by means of the data bus. If, however, the peripheral device is something other than a memory device, such as a printer, modem, or a co-processor, then additional hardware is generally required in the peripheral device in order to decode and act on the address reference.

In order to avoid the need for this additional hardware, a technique called "memory-mapped I/O" is used. According to this technique, the transfer of data to and from peripheral devices is accomplished by using some of the normally available memory space. Memory addresses are decoded within the peripheral device and thus are used to determine when a specific device is being addressed. Usually, each type of function within the peripheral device is assigned a memory address and may then be accessed by the CPU. For example, the status, control and data registers within the peripheral devices are each assigned a memory address and thus three addresses are required for the CPU to perform an I/O operation with this peripheral device. Using memory-mapped I/O in this fashion allows I/O operations to be performed directly in a high-level language, i.e., an I/O device may be declared as a data structure and then manipulated with the use of pointers.

Referring to FIG. 1, in a conventional microprocessor architecture, the sequence of events occurring during a basic CPU access to either memory or peripheral device for a read transaction or a write transaction is performed in two cycles of a bus clock, the cycles commonly being labeled T1 and T2. During the first half of cycle T1, the CPU asserts an Address Strobe signal $\overline{ADS}$ which indicates that a bus cycle has begun and that a valid address is on the Address Bus. From the beginning of cycle T1 until the completion of the bus cycle, the CPU drives the Address Bus and other relevant control signals. If the bus cycle is not cancelled (e.g. cycle T2 is entered in the next clock cycle), the CPU will assert a Confirm signal $\overline{CONF}$ in the middle of cycle T1 to indicate that the bus cycle initiated by the Address Strobe $\overline{ADS}$ is valid. A confirmed bus cycle is completed at the end of cycle T2. In the case of a read operation, the CPU samples the Data Bus at the end of cycle T2. If a bus exception is detected, then data on the Data Bus is ignored. For write operations, valid data is output on the Data Bus to the address indicated on the Address Bus from the middle of cycle T1 until the end of the cycle.

The desire for improved microprocessor performance is leading to integration of certain functions which, in the past, had been external to the CPU (e.g. peripheral devices such as controllers and co-processors). Integration of these functions means that the status, control and data registers associated with the newly-integrated functions are located internally to the CPU, not externally as before. Thus, while these registers may still be referenced as memory-mapped, the CPU access to the internal memory-mapped registers no longer occurs over the external bus, but rather occurs over an internal bus, thus making the transaction essentially transparent to the user. The inability to observe the read/write operations of these internal registers makes it extremely difficult to trace CPU activity and it becomes very difficult to debug the system.

Some systems, e.g., the Intel 80186 microprocessor, solve the problem by showing accesses to internal memory-mapped registers as normal read/write cycles, as described above. However, the CPU ignores the synchronous and asynchronous ready bits as well as the data bus, thus the data contained in the internal memory-mapped registers can not be observed.

In National Semiconductor's HPC 16083 controller, the read and write strobes are inhibited. Thus, during a write operation, the data is presented on the bus, whereas during a read operation, data is not presented on the bus.

SUMMARY OF THE INVENTION

The present invention provides a microprocessor architecture which allows the contents of internal memory-mapped registers to be observed. This is achieved by adding a new CPU output signal to the conventional architecture which indicates that an internal bus cycle is underway, deactivating the CPU output signal which validates an external reference cycle and then accessing the contents of the internal memory-mapped registers and placing the information contained therein on the data bus for observation.

The present invention will thus aid system programmers by allowing them to trace program activity with the internal registers of the CPU, an invaluable debugging tool. This will further facilitate the integration of controllers and co-processors on-chip since system designers will now be able troubleshoot internal problems associated with integration.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE INVENTION

Figure 2:
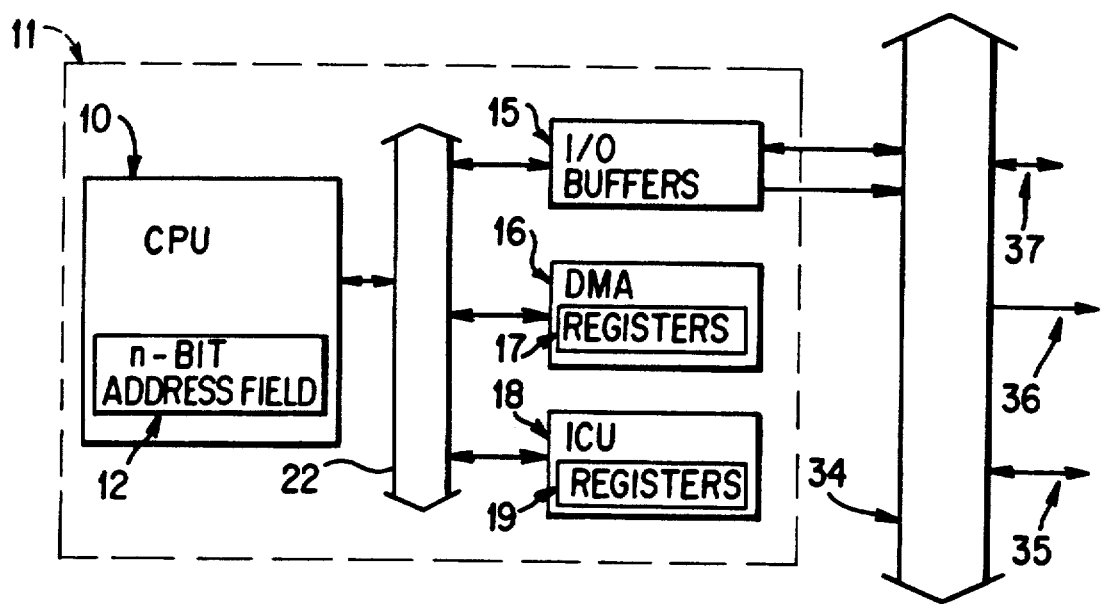
FIG. 2 is a block diagram illustrating a typical microprocessor chip with integrated controllers.
Figure 3:
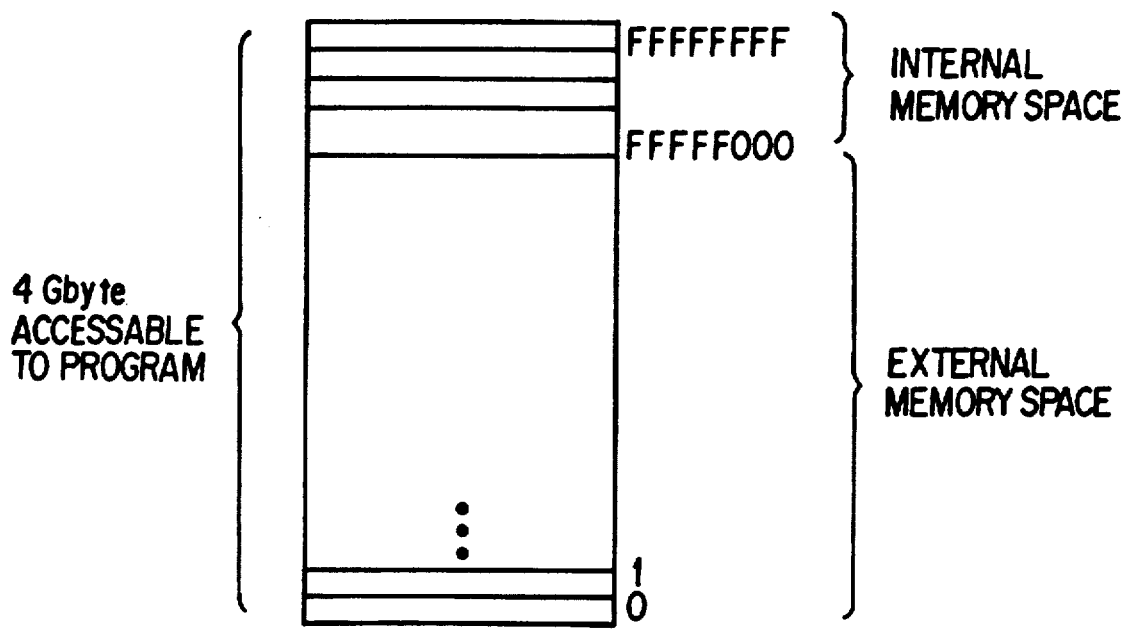
FIG. 3 is a block diagram illustrating memory allocation of a microprocessor which utilizes memory-mapped addressing.

FIG. 2 shows a general block diagram of a microprocessor (CPU) 10 with Direct Memory access (DMA) 16 and Interrupt Control Unit (ICU) 18 integrated on chip 11. The DMA 16 and ICU 18 are interfaced with the CPU 10 by means of an internal bus 22. User interface to the DMA 16 and ICU 18 is provided via the I/O buffers 15 on the system bus 34, which includes a Data Bus 35, and Address Bus 36 and I/O pints 37. The CPU 10 is capable of addressing $2^N$ locations, where N is the number of bits in the CPU's address field 12. The memory of the CPU 10 is organized as a set of linear addresses beginning at 0 and ending at N-1. A portion of these memory addresses are dedicated for memory-mapping. For example, in National Semiconductor'NS-32532 32-bit microprocessor chip, $2^{32}$ (4 gigabytes) of linear address space can be referenced and these addresses are numbered sequentially starting at zero and ending at $2^{32}-1$. As shown in FIG. 2, the hex addresses in the range FFFFF000 to FFFFFFFF are dedicated to on-chip ("internal") memory-mapped registers. The DMA 16 and ICU 18 each have Control and Status Registers 17 and 19, respectively, which are referenced as memory-mapped registers.

Figure 1:
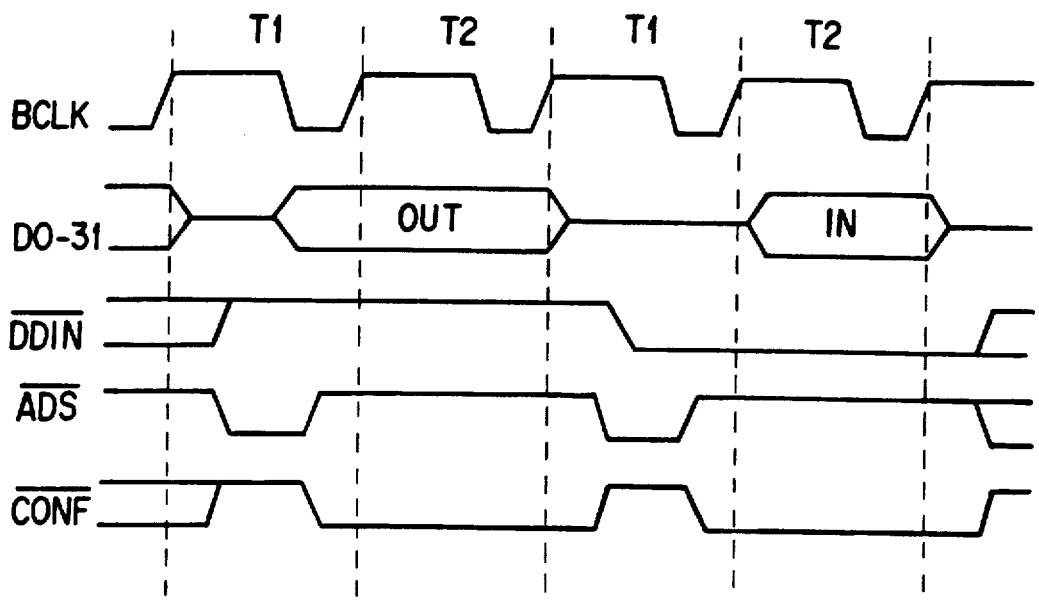
FIG. 1 is a timing diagram illustrating a read and write cycle of a conventional microprocessor.

The basic CPU operation to read from and write to external memory and peripheral devices consists of activating a first output signal to indicate that a bus cycle has begun and that there is a valid address on the Address Bus 36. Next, if the bus cycle is not cancelled, a second output signal is asserted which qualifies access to the peripheral by confirming that a valid bus cycle is underway. Lastly access to the peripheral is gained and the data is presented on the Data Bus 35, the direction of data transfer depending on the value of a third output signal. For example, referring to FIG. 1, in the National Semiconductor NS-32532 microprocessor, the basic bus cycles occur during two cycles (T1 and T2) of the Bus Clock BCLK. The CPU asserts Address Strobe signal $\overline{ADS}$ during the first half of cycle T1 to indicate the beginning of a bus cycle. Next, the CPU asserts a Confirm Bus Cycle signal $\overline{CONF}$ to allow external access, $\overline{CONF}$ being active from the middle of cycle T1 until the completion of the bus cycle, at which time $\overline{CONF}$ is negated. Data transfer may then take place and be observed on the Data Bus 35. The direction of transfer is indicated by output signal Data Direction $\overline{DDIN}$, i.e., write when $\overline{DDIN}$ is high and read when $\overline{DDIN}$ is low.

Figure 4:
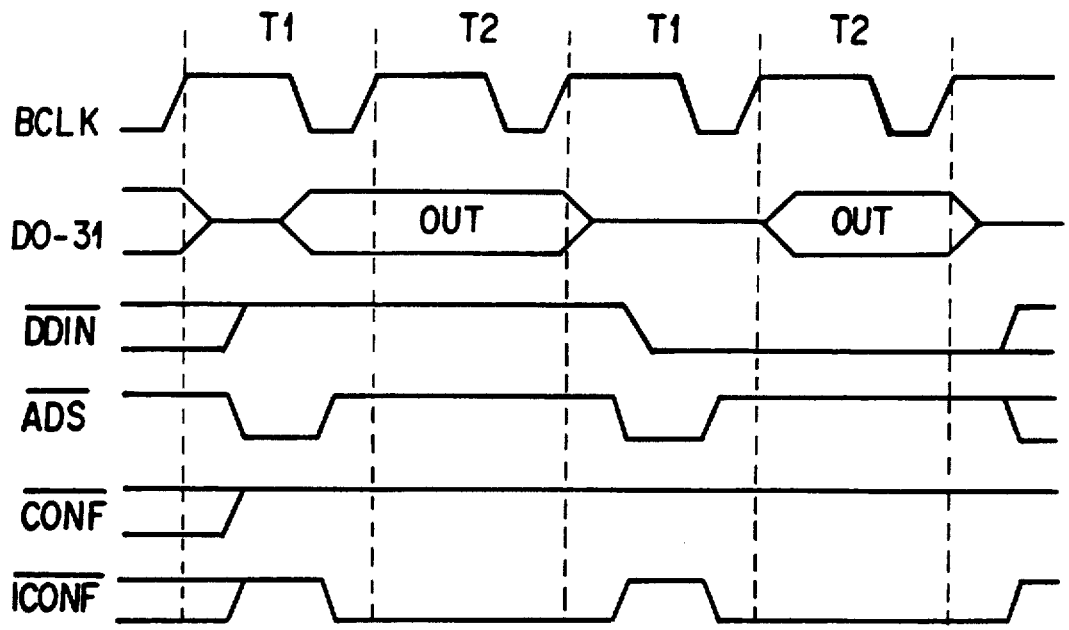
FIG. 4 is a timing digram illustrating internal read and write cycles of a microprocessor in accord with the present invention.

In contrast to a normal read or write request involving an externally located peripheral, the on-chip registers 17 and 19 cannot be readily observed on the system bus 34. Therefore, according to the present invention, the normal read/write cycle may be modified by deactivating the output signal which allows external access and by asserting a fourth output signal which indicates that access to internal memory-mapped registers 17 and 19 will take place. The contents of the internal registers 17 and 19 may then be observed on the Data Bus 35. As shown in FIG. 4, in this case $\overline{CONF}$ is held inactive, thus disabling external memory access. A new output signal, Confirm Internal Bus Cycle $\overline{ICONF}$ is then asserted indicating internal access is requested and bus control inputs should be ignored. Data is presented on the Data Bus 35. Note however, that on internal read cycles, $\overline{DDIN}$ is low, but the data direction is the same as in a write cycle.

It should be understood that various alternatives to the embodiment shown here may be employed in practicing the present invention. It is intended that the following claims define the invention and that the structure and methods within the scope of these claims and their equivalents be covered thereby.

We claim:

1. In an integrated data processing system that includes a central processing unit (CPU) connected via an internal bus to an internal functional unit for transfer of data therebetween, and an I/O buffer connected between the internal bush and a system bus, the system bus having a peripheral unit connected thereto such that data may be transferred between the CPU and the peripheral unit via a data path comprising the internal bus, the I/O buffer and the system bus, and wherein the CPU includes control means for controlling the transfer of data both between the CPU and the internal functional unit and between the CPU and the peripheral unit by generating a reference address that identifies either the internal functional unit or the peripheral unit, thereby allowing data to be transferred to be placed on the internal bus, and then, only in the event that the reference address identifies the peripheral unit, asserting a confirmation signal that allows the data to be transferred to be accessed from the internal bus by the system bus via the I/O buffer for transfer to the peripheral unit, the improvement comprising internal access confirmation means located within the CPU for, in the event that the reference address identifies the internal functional unit, asserting an internal confirmation signal that allows the data to be transferred to be accessed from the internal bus by the system bus via the I/O buffer whereby all data transfers appearing on the internal bus, whether involving the internal functional unit or the peripheral unit, may be monitored by a monitoring device connected to the system bus.

2. In a data processing system having a system bus, a peripheral device connected to the system bus, and an integrated microprocessor connected to the system bus, said microprocessor including an internal bus, an internal functional device connected to the internal bus, and I/O buffer connected to the internal bus and to the system bus, and a central processing unit (CPU) connected to the internal bus, whereby data may be transferred between the CPU and the peripheral device via a data path comprising the internal bus, the I/O buffer, and the system bus, said CPU having means for generating a reference address and means for controlling data transfer in response to the reference address such that if the reference address identifies the peripheral device, said control means asserts a confirmation signal which enables the data path, and if the reference address identifies the internal device, said control means does not assert the confirmation signal, the improvement comprising means for generating an internal confirmation signal to enable the data path such that if the reference address identifies the internal device, said control means asserts the internal confirmation signal but does not assert the confirmation signal so that transfers occurring on the internal bus may be observed by a monitoring device connected to the system bus.

3. A data processing system having a system bus, a peripheral device connected to the system bus, and integrated microprocessor connected to the system bus, said microprocessor including an internal bus, an internal functional device connected to the internal bus, and I/O buffer connected to the internal bus, and a central processing unit (CPU), said CPU including means for generating a reference address and means for controlling data transfer responsive to the reference address, whereby an external confirmation signal is asserted by the control means to enable a data path comprising the internal bus, the I/O buffer, and the system bus if and only if the reference address identifies the peripheral device, the CPU comprising means for generating an internal confirmation signal to enable the data path, whereby the external confirmation signal is asserted and the internal confirmation signal is deasserted if the reference address identifies a peripheral device and the external confirmation signal is deasserted and the internal confirmation signal is asserted if the reference address identifies an internal device.

4. In a microcomputer system of the type having a microprocessor integrated with and coupled to a plurality of data processing system components via an internal bus, including at least one internal peripheral device and a buffer, said buffer being coupled to at least one external peripheral device via a system bus, wherein said peripheral devices are referenced by the microprocessor as memory-mapped, and wherein the microprocessor controls the transfer of information between the internal bus and the system bus by generating an address at the start of a bus cycle, then asserting a first control signal during the bus cycle to grant access by the buffer to the system bus for the remainder of the bus cycle, wherein if the address generated by the microprocessor identifies the internal peripheral device, said first control signal is not asserted, the improvement comprising negating the first control signal and asserting a second control signal during the bus cycle, said second control signal granting access by the buffer to the system bus for the remainder of the bus cycle.

5. An integrated microprocessor utilizable in a data processing system having a system bus, comprising:
  an internal bus;
  processor means coupled to the internal bus for performing data processing functions, said processor means including means for generating a plurality of control signals; and
  buffer means coupled to the internal bus for accessing the system bus;
  wherein said processor means generates a first control signal and a second control signal such that said buffer means is granted access to the system bus when the first control signal is active and the second control signal is inactive or when the second control signal is active and the first control signal is inactive.

6. A method for observing data transactions that occur on an internal bus of an integrated circuit microprocessor chip, wherein the chip includes a processor and a peripheral device integrated therewith which communicate with each other via the internal bus and an I/O buffer coupled to the internal bus and to a system bus, wherein said processor means generates a first control signal and a second control signal such that said buffer means accesses the system bus when the first control signal is asserted and the second control signal is deasserted or when the second control signal is asserted and the first control signal is deasserted.

* * * * *